(12) United States Patent
Tai

(10) Patent No.: US 7,599,809 B2
(45) Date of Patent: Oct. 6, 2009

(54) PROCESSOR CAPABLE OF ALERTING ITS LIFE EXPECTANCY AND METHOD THEREOF

(75) Inventor: Wen-Chung Tai, Taipei (TW)

(73) Assignee: DMP Electronics Inc., Taipei Hsien (TW)

( * ) Notice: Subject to any disclaimer, the term of this patent is extended or adjusted under 35 U.S.C. 154(b) by 452 days.

(21) Appl. No.: 11/651,510

(22) Filed: Jan. 10, 2007

(65) Prior Publication Data

US 2007/0229033 A1 Oct. 4, 2007

(30) Foreign Application Priority Data

Apr. 3, 2006 (TW) .............. 95111759 A

(51) Int. Cl.
G01R 29/02 (2006.01)
G01R 23/10 (2006.01)

(52) U.S. Cl. .................. 702/79; 702/78

(58) Field of Classification Search ............. 702/78, 702/79

See application file for complete search history.

(56) References Cited

U.S. PATENT DOCUMENTS 5,923,870 A * 7/1999 Johns et al. ............. 713/502

* cited by examiner

Primary Examiner—Akm E Ullah
Assistant Examiner—Richard V Muralidar
(74) Attorney, Agent, or Firm—Bacon & Thomas, PLLC

(57) ABSTRACT

The present invention discloses a processor capable of alerting its life expectancy and its method. The processor is installed in an electronic device having a control circuit, a frequency divider circuit and a time counter. The control circuit is connected to the frequency divider circuit and the time counter. The frequency divider circuit receives a plurality of high frequencies from the control circuit and converts the high frequencies into a time unit. The time counter adds the time units one by one to obtain a use time. If the use time has reached a predetermined use time, the control circuit will issue a warning to indicate that the life expectancy of the processor is reached, so as to reflect the actual use time of the processor, prevent a change of use time by software, and allow users to timely take proper preventive measures before the processor exceeds its life cycle.

14 Claims, 4 Drawing Sheets

PROCESSOR CAPABLE OF ALERTING ITS LIFE EXPECTANCY AND METHOD THEREOF

FIELD OF THE INVENTION

The present invention relates to a processor, and more particularly to a processor installed in an electronic apparatus and capable of continuously issuing a plurality of high frequencies, converting the high frequencies into time units respectively, and adding the time units one by one to obtain a use time. After the processor detects that a predetermined use time of the processor is reached, the processor will issue a warning signal to indicate that the life expectancy of the processor is reached.

BACKGROUND OF THE INVENTION

Since it is an era with well-developed information technologies and a blooming electronic industry, various different high-tech products are derived from computers, and the mobile communication is developed rapidly. All these technologies and products are indispensable to our life and shorten the time and space between people. As the present electronic computing products (such as mobile phones, personal computers, notebook computers, laptops or servers, and other computer devices) are getting more popular and extensively used, the market competition becomes increasingly severer.

The aforementioned multi-functional electronic computing products require powerful central processing units (CPU) or other processors (hereinafter referred to as processor) to control the performance of high-speed computation and data processing of the electronic computing products. Therefore, the processor is the center for controlling the operations of the whole computer, and thus the processor is known as the heart of a computer. In general, a processor includes a control unit, an arithmetic logic unit (ALU), (wherein the "control circuit" as described in this specification refers to both control unit and ALU), a register and a memory unit. When a computer system starts operating, the processor reads the instructions and data of an operating system from the memory, and the ALU computes the data and saves the result back to the memory, and the circuit designed on a motherboard communicates with other components or peripheral interfaces to achieve the purpose of data processing. Processors generally come with different designs and functions based on different hardware architectures including data/instruction formats, allocations, decoding, interfaces and operation methods.

However, these powerful processors may fail for their limited life cycle without any warning in advance, not only causing tremendous inconvenience and trouble to users, but also interrupting the executing program and resulting in a data loss. As to the servers of a large corporation, the failure of a processor without any warning in advance may paralyze the business and the whole operation of the corporation, and the damage incurred is much larger than we can imagine.

In view of the foregoing issues, traditional computers usually record time in a basic input output system (BIOS) for controlling the processor during its use after the computer is booted. The BIOS is stored in a memory (such as a complementary metal oxide semiconductor (CMOS)) of the computer, and then the time recorded in the CMOS is read for computations. The use time of the processor can be calculated by the number of operating hours of the computer. Since the time recorded in the BIOS can be changed freely by software, users may not know the actual use time of the processor, and such time gives no guarantee to users who purchase the electronic computing products. Furthermore, the use time stored in the memory relies on electric power, and the memory cannot save a new accumulated use time during a system crash or a power failure, and thus an accurate use time of the processor cannot be provided to users effectively. Obviously, it is an important issue for computer manufacturers to find a way of designing a processor capable of alerting its life expectancy and a method thereof, so as to effectively and accurately provide the actual use time of a processor and prevent people from altering the use time, and facilitate users to take appropriate preventive measures before the processor exceeds its life cycle.

SUMMARY OF THE INVENTION

In view of the prior art that cannot reflect the actual use time of a processor effectively and reliably, but causing all kinds of drawbacks, the inventor of the present invention based on years of experience to conduct extensive researches and experiments, and finally developed and designed a processor capable of alerting its life expectancy and a method thereof in accordance with the present invention.

Therefore, it is a primary objective of the present invention to provide a processor capable of alerting its life expectancy, and the processor is installed in an electronic device having a control circuit, a frequency divider circuit and a time counter, and the control circuit is connected separately to the frequency divider circuit and the time counter. If the electronic device is turned on and the processor is started, the frequency divider circuit will receive a plurality of high frequencies continuously issued by the control circuit and convert the high frequencies into time units respectively, and the time counter adds the time units one by one to obtain a use time. If the processor detects that the use time has reached a predetermined use time, the control circuit will issue a warning to indicate that the life expectancy of the processor has reached the predetermined use time. Therefore, the invention can reflect the actual use time of the processor, prevent a change of use time by software, and allow users to timely take proper preventive measures before the processor exceeds its life cycle.

Another objective of the present invention is to provide a method for alerting the life expectancy of a processor and the method is applied in a processor, such that the processor continuously issues a plurality of high frequencies, and converts the high frequencies into time units respectively, and adds the time units one by one to obtain a use time. After the processor detects that the use time has reached a predetermined use time, the processor will issue a warning. Therefore, the invention can reflect the actual use time of the processor, prevent a change of use time by software, and allow users to timely take proper preventive measures before the processor exceeds its life cycle.

To make it easier for our examiner to understand the objective, technical characteristics and effects of the present invention, preferred embodiments will be described with accompanying drawings as follows:

DETAILED DESCRIPTION OF THE PREFERRED EMBODIMENTS

Figure 1:
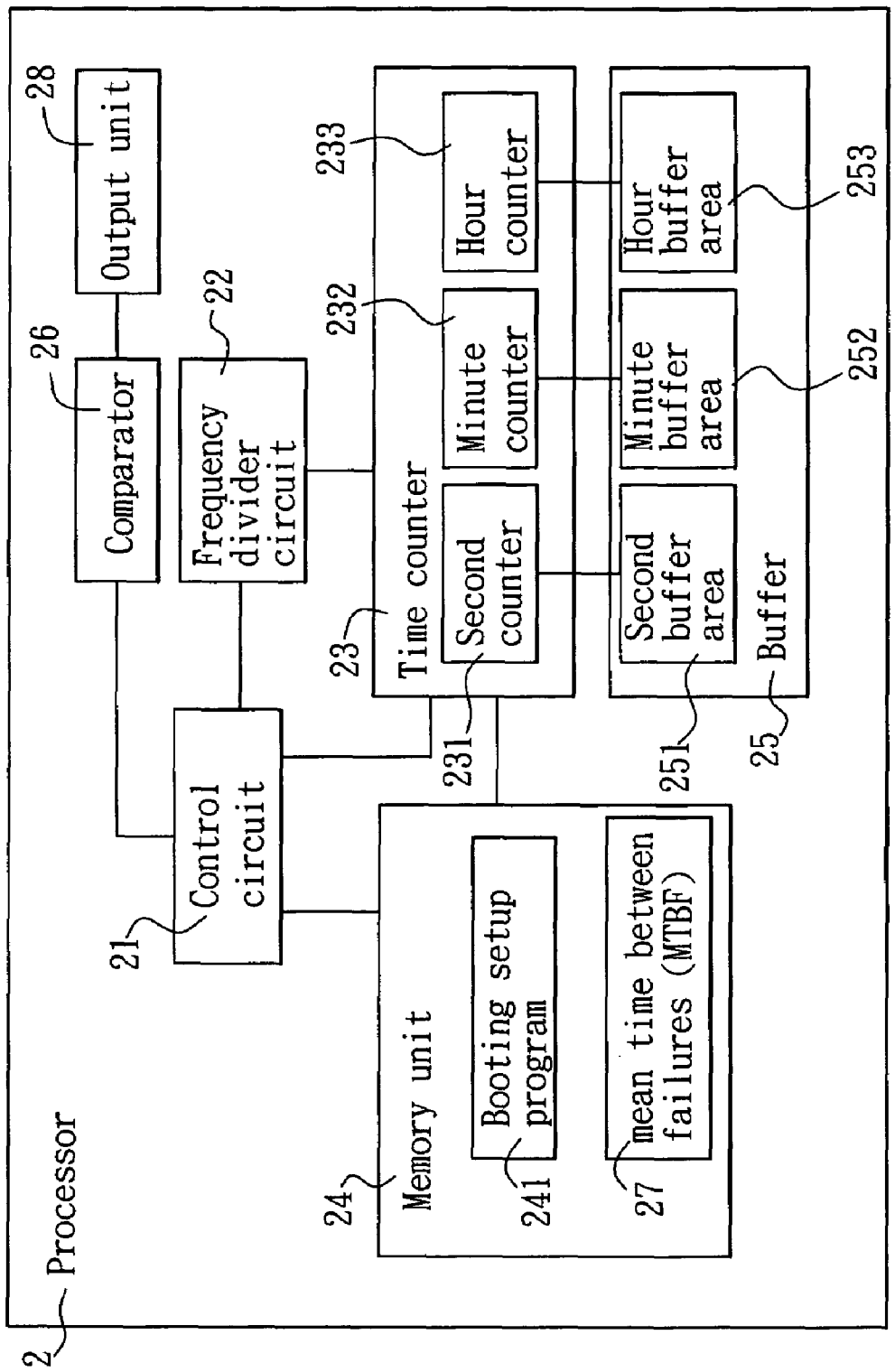
FIG. 1 is a schematic block diagram of an apparatus for alerting the life expectancy of a processor in accordance with the present invention.

Referring to FIG. 1 for a processor capable of alerting its life expectancy in accordance with the present invention, a processor 2 (such as a central processing unit, CPU) is installed in an electronic device (such as a computer device), and the processor 2 includes a control circuit 21 (such as a control unit, CU and an arithmetic logic unit, ALU), a frequency divider circuit 22 and a time counter 23, and the control circuit 21 is connected separately to the frequency divider circuit 22 and the time counter 23. After the electronic device is turned on and the processor 2 is started, the frequency divider circuit 22 receives a plurality of high frequencies issued continuously by the control circuit 21, and sequentially converts the high frequencies into a time unit (such as hour, minute and second), and the time counter 23 can add the time units one by one to obtain a use time (such that the hours of use). If the processor 2 detects that the use time has reached a predetermined use time, the control circuit 21 will issue a warning to indicate that the life expectancy of the processor 2 has reached the predetermined use time. Thus, the invention can reflect the actual use time of the processor 2, prevent a change of use time by software, and allow users to timely take proper preventive measures before the processor exceeds its life cycle.

It is noteworthy to point out that the processor 2 is not limited to the active chips such as the central processing unit, and the processor 2 of the invention can be any other chip installed in the electronic device for monitoring the use life of the processor, so that users can know about the use life of the processor 2 accurately and reliably.

In FIG. 1, the processor 2 of the invention further comprises a memory unit 24 (such as a flash memory or a read only memory, ROM) and a buffer 25 (such as a random access memory, RAM; or a register). The buffer 25 is connected to the time counter 23 and provided for the time counter 23 to access the time unit and the use time, and the memory unit 24 is connected separately to the control circuit 21 and the time counter 23. The time counter 23 saves the accumulated use time stored in the buffer 25 into the memory unit 24 within a specific time period (such as every hour) in order to prevent a loss of the use time during a system crash or a power failure. The memory unit 24 further includes a booting setup program 241. When the booting setup program 241 boots the electronic device for every time, the booting setup program 241 increments the use time stored in the memory unit 24 by one time unit, and sends the result to the buffer 25, and then the time counter 23 continues accumulating the use time.

In the preferred embodiment as shown in FIG. 1, the frequency divider circuit 22 divides the frequency by the CPU clock to convert the high frequencies sequentially into a second unit by a square wave per second. The time counter 23 includes a second counter 231, a minute counter 232 and an hour counter 233, and the minute counter 232 is connected separately to the second counter 231 and the hour counter 233, and the buffers 25 corresponding to the second counter 231, the minute counter 232 and the hour counter 233 include a second buffer area 251, a minute buffer area 252 and an hour buffer area 253 respectively. The second counter 231, minute counter 232 and hour counter 233 are connected to their respective buffer areas 251, 252, 253, so that a second unit received by the second counter 231 is added to the time unit (a second unit) stored in the second buffer area 251. If the accumulated time unit exceeds 59 second units, then a minute unit will be issued to the minute counter 232. The minute unit in the minute counter 232 is added to the time unit (a minute unit) stored in the minute buffer area 252, such that if the accumulated time unit exceeds 59 minute units, then an hour unit will be issued to the hour counter 233. Similarly, the hour unit stored in the hour counter 233 is added to the time unit (a hour unit) stored in the hour buffer area 253, and the hour counter 233 saves the time unit (a hour unit) into the memory unit 24.

In the preferred embodiment as shown in FIG. 1, the processor 2 further comprises a comparator 26 coupled to the control circuit 21, and the memory unit 24 further includes a mean time between failures (MTBF) 27 used for measuring and determining the reliability of the processor 2 and predicting a possible failure of the processor 2 occurred in a specific time period. For example, the processor 2 may fail after a use of 50,000±1,500 hours. The comparator 26 keeps comparing the time unit (an hour unit) stored in the hour buffer area 253 with the mean time between failures (MTBF) 27, until the time unit is equal to the mean time between failures (MTBF) 27 or falls within the range of the mean time between failures (MTBF) 27. If the accumulated time unit (an hour time) of the hour counter 233 is equal to the mean time between failures (MTBF) 27, the comparator 26 will issue a warning signal through an output unit 28 (such as a speaker or a screen) installed in the processor 2.

In summation of the description above, each component of the present invention is installed in the processor 2, and thus the use time recorded in the processor 2 cannot be modified or faked by software. The use time is stored in the memory unit 24 for preventing a loss of the use time of the electronic device during a system crash of the electronic device or a power failure, so as to effectively and reliably control the use time of the processor 2.

In FIG. 1, a method for alerting the life expectancy of a processor of the invention is applied to a processor 2 (such as a central processing unit, CPU), such that the processor 2 keeps issuing a plurality of high frequencies which are converted into time units respectively, and the time units are added one by one to obtain a use time. If the processor 2 detects that the use time has reached a predetermined use time, the processor 2 will issue a warning. The present invention can prevent a change of use time of the processor 2 by software, so that users can obtain the actual use time of the processor 2 and take proper preventive measures timely before the processor 2 exceeds its use life.

Figure 2:
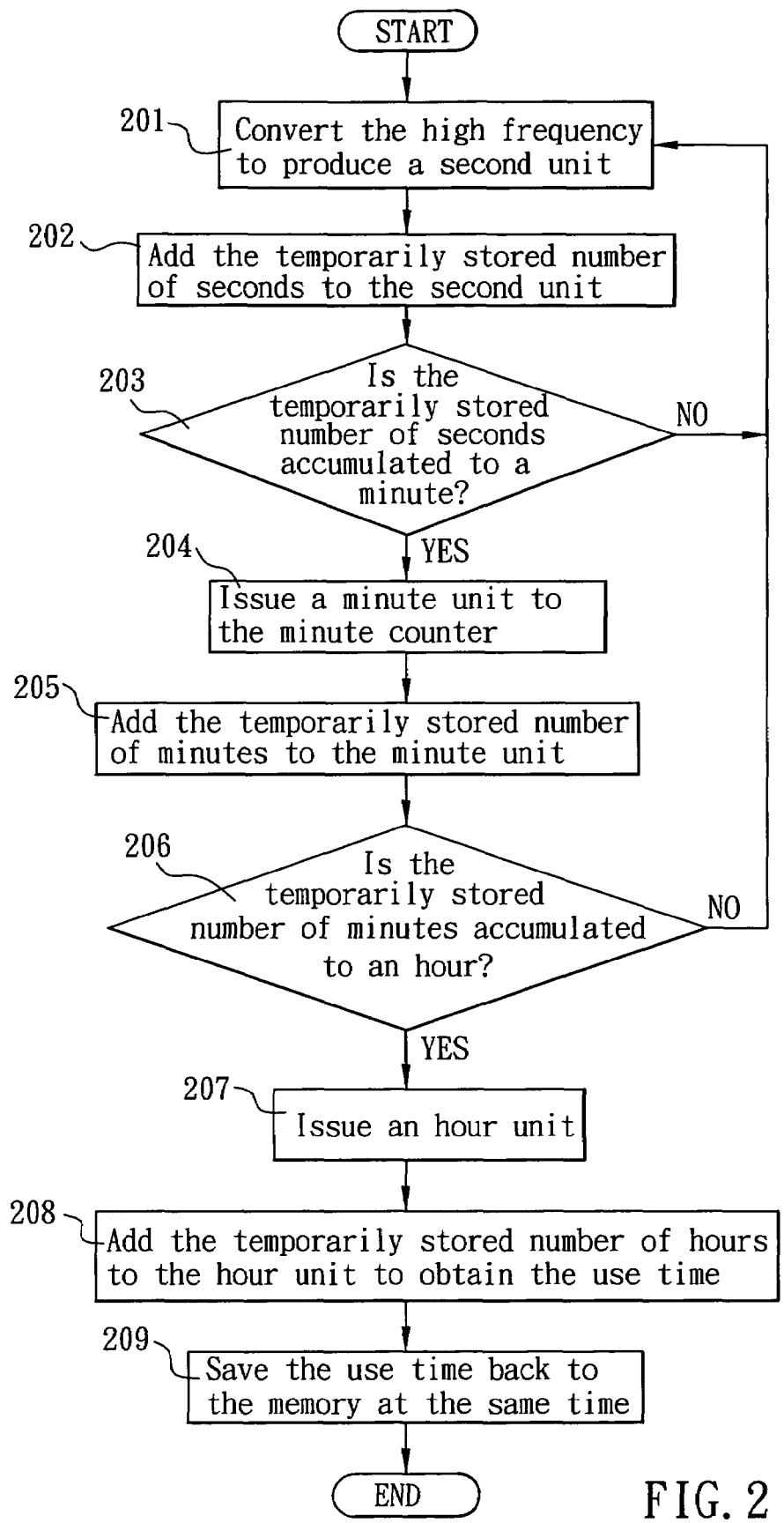
FIG. 2 is a flow chart of a method for alerting the life expectancy of a processor in accordance with a first preferred embodiment of the present invention.

In a preferred embodiment of the present invention as shown in FIG. 1, the processor 2 is installed in an electronic device (such as a computing device), and the processor 2 includes a time counter 23, a memory unit 24 (such as a flash memory) and a buffer 25 (such as a random access memory, RAM; or a register). The time counter 23 can be comprised of a second counter 231, a minute counter 232 and an hour counter 233. The buffer 25 is provided for the second counter 231, the minute counter 232 and the hour counter 233 to access their corresponding temporarily stored second, minute and hour as shown in FIG. 2. If the electronic device is turned on and the processor 2 is started, the processor 2 will process the following procedure comprising the steps of:

Step (201): The processor 2 converts the high frequencies one by one into a second unit by a square wave per second and saves the second units into the second counter 231.

Step (202): The second counter 231 adds the temporarily stored number of seconds to the second units and saves the result into the buffer 25.

Step (203): The second counter 231 determines whether or not the temporarily stored number of seconds is accumulated to a minute; if yes, then go to Step (204), or else go to Step (201).

Step (204): The second counter 231 issues a minute unit to the minute counter 232.

Step (205): The minute counter 232 adds the temporarily stored number of minutes to the minute unit and saves the result back to the buffer 25.

Step (206): The minute counter 232 determines whether or not the temporarily stored number of minutes is accumulated to an hour; if yes, then go to Step (207), or else go to Step (201).

Step (207): The minute counter 232 issue an hour unit to the hour counter 233.

Step (208): The hour counter 233 adds the temporarily stored number of hours to the hour unit to obtain the use time and stores the use time to the buffer 25.

Step (209): The hour counter 233 saves the use time back to the memory unit 24 at the same time to avoid a loss of the use time if the electronic computing device is turned off or a power failure occurs.

Figure 3:
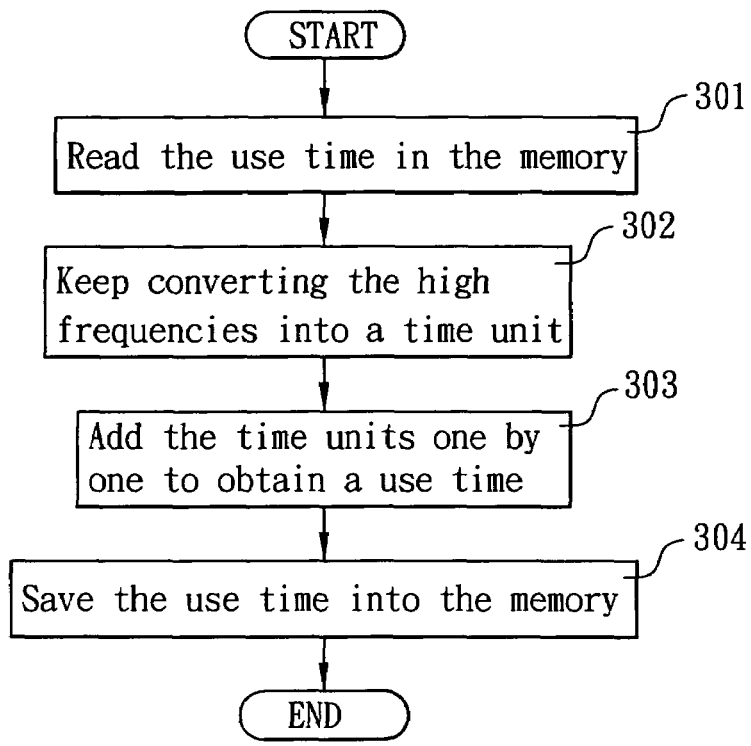
FIG. 3 is a flow chart of a method for alerting the life expectancy of a processor in accordance with a second preferred embodiment of the present invention.

In this preferred embodiment, the memory unit 24 further includes a booting setup program 241, such that if the booting setup program 241 is executed as shown in FIG. 3, the processor 2 will process the following procedure comprising the steps of:

Step (301): reading the use time previously recorded in the memory unit 24 by the booting setup program 241;

Step (302): continuously converting the high frequencies into the time units;

Step (303): allowing the time counter 23 to add the time units one by one to the use time; and Step (304): saving the use time into the memory unit 24.

Figure 4:
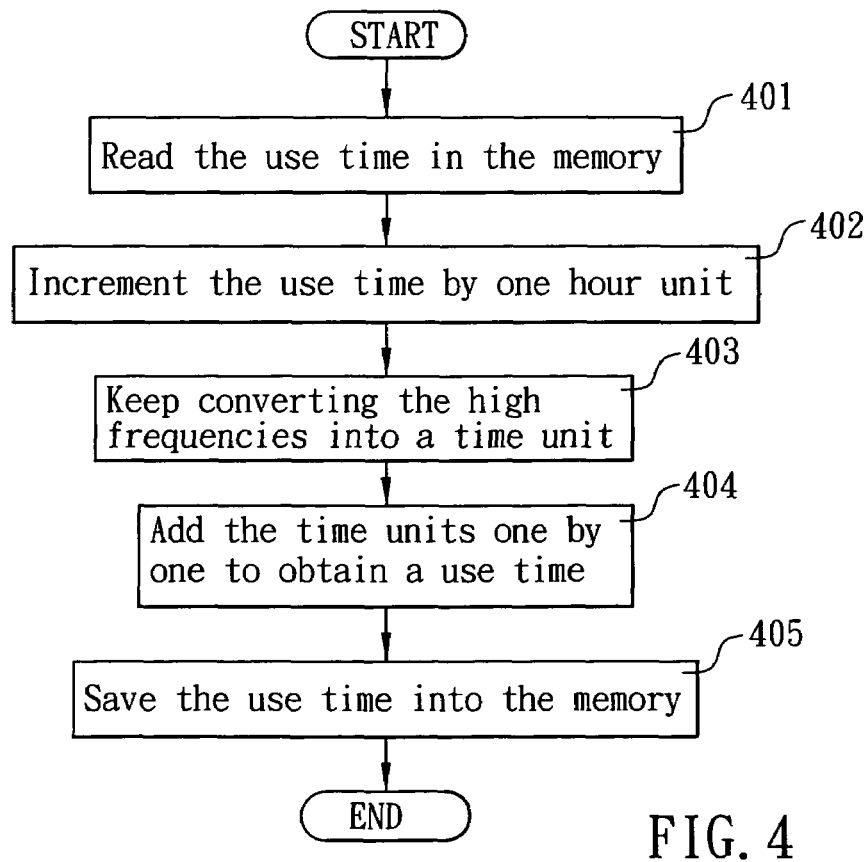
FIG. 4 is a flow chart of a method for alerting the life expectancy of a processor in accordance with a third preferred embodiment of the present invention.

In another preferred embodiment, the booting setup program 241 allows the time counter 23 to start adding from the next time unit to prevent the use time from being lost without any warning before the use time is saved back to the memory unit 24, such that if the booting setup program 241 is executed as shown in FIG. 4, the processor 2 will process the following procedure comprising the steps of:

Step (401): reading the use time previously stored in the memory unit 24 by the booting setup program 241;

Step (402): adding a time unit to the use time and recording the use time into the buffer 25;

Step (403): continuously converting the high frequencies into the time unit;

Step (404): allowing the time counter 23 to add the time units one by one to obtain the use time; and Step (405): saving the use time into the memory unit 24.

Figure 5:
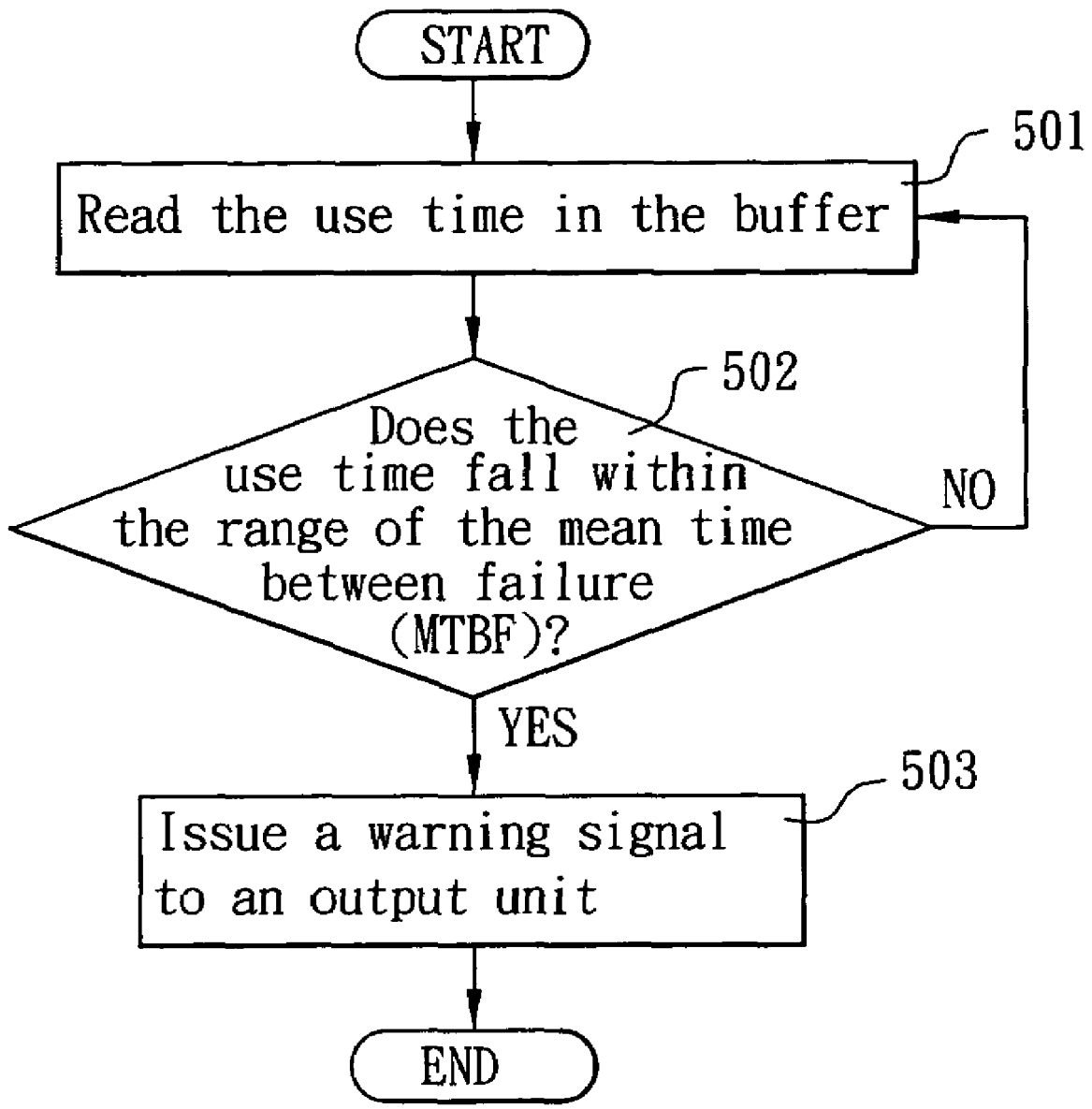
FIG. 5 is a flow chart of a method for alerting the life expectancy of a processor in accordance with a fourth preferred embodiment of the present invention.

In the preferred embodiment as shown in FIG. 1, the processor 2 further includes a comparator 26 and a mean time between failures (MTBF) 27. If the hour counter 233 adds the hour units and save the use time back to the buffer 25 as shown in FIG. 5, the comparator 26 processes the following procedure comprising the steps of:

Step (501): reading a use time in the buffer 25;

Step (502): comparing the use time with the mean time between failures (MTBF) 27 to determine whether or not the use time falls within the range of the mean time between failures (MTBF) 27; if yes, go to Step (503), or else go to Step (501); and Step (503): issuing a warning signal to an output unit 28 (such as a speaker or a screen) of the electronic device.

In another method for alerting the life expectancy of a processor in accordance with the present invention as shown in FIG. 1, the method is applied in the processor 2 (such as a central processing unit, CPU), such that the processor 2 continuously issues a plurality of high frequencies, and converts the high frequencies into time units respectively, and the time units are deducted one by one from a predetermined use time set in the processor 2, and the remaining predetermined use time is stored and recorded. If the processor 2 detects that the remaining predetermined use time is not a positive integer, then the processor 2 will issue a warning.

It is noteworthy to point out that the scope of claims of the present invention is not limited to adding or subtracting the time units one by one to approach the predetermined use time, but any computation method implying that the use life of the processor 2 matches with the predetermined use time or varies in a direct proportion with the predetermined use time and achieving the effect of informing or warning users is intended to be covered by the scope of claims of the present invention.

While the invention herein disclosed has been described by means of specific embodiments, numerous modifications and variations could be made thereto by those skilled in the art without departing from the scope and spirit of the invention set forth in the claims.

What is claimed is:

1. A processor capable of alerting its life expectancy, comprising:

a frequency divider circuit, for receiving a plurality of high frequencies, and converting said high frequencies one by one into a time unit separately;

a time counter, coupled to said frequency divider circuit, for adding said time units converted by said frequency divider circuit to obtain a use time; and a control circuit, coupled separately to said frequency divider circuit and said time counter, for issuing said high frequencies to said frequency divider circuit continuously, and receiving a use time from said time counter, and said control circuit issues a warning signal when said use time has reached a predetermined use time.

2. The processor of claim 1, further comprising a comparator coupled to said control circuit, for comparing said use time and said predetermined use time.

3. The processor of claim 2, further comprising a memory unit coupled separately to said control circuit and said time counter, and said memory unit is provided for storing said use time.

4. The processor of claim 3, wherein said buffer is coupled to said time counter and provided for said time counter to access said time unit and said use time.

5. The processor of claim 4, wherein said memory unit further includes a booting setup program, so that said booting setup program can send said use time in said memory unit to said buffer, after said electronic device is turned on.

6. The processor of claim 4, wherein said memory unit further includes a booting setup program, such that said booting setup program adds a time unit to said use time in said memory unit and sends the result to said buffer, after said electronic device is turned on.

7. The processor of claim 4, wherein said frequency divider circuit converts said high frequencies sequentially into a second unit by one square wave per second.

8. The processor of claim 7, wherein said time counter comprises:
- a second counter, installed in said time counter, for receiving and adding said second units one by one to said buffer, and issuing a minute unit when a minute is accumulated;
- a minute counter, installed in said time counter and coupled to said second counter, for receiving and adding said minute units one by one to said buffer, and issuing an hour unit when an hour is accumulated; and
- an hour counter, installed in said time counter and coupled to said minute counter, for receiving and adding said hour units to said use time, and said hour counter stores and records said use time into said memory unit and said buffer.

9. The processor of claim 8, wherein said buffer comprises:
- a second buffer area, disposed in said buffer and coupled to said second counter, and provided for said second counter to access said second unit;
- a minute buffer area, disposed in said buffer and coupled to said minute counter, and provided for said minute counter to access said minute unit; and
- an hour buffer area, disposed in said buffer and coupled to said hour counter, and provided for said hour counter to access said hour unit.

10. The processor of claim 4, wherein said predetermined use time is a mean time between failures (MTBF) of said memory unit.

11. A method for alerting the life expectancy of a processor, which is applied to a processor, and said processor processes a procedure comprising the steps of:
- issuing a plurality of high frequencies continuously;
- converting said high frequencies separately into a time unit;
- adding said time units to obtain a use time, and storing and recording said use time; and
- issuing a warning, when said use time is detected to be reaching a predetermined use time.

12. The method of claim 11, wherein said processor further includes a booting setup program, such that when said booting setup program is executed, said processor will process a procedure comprising the steps of:
- reading said previously recorded use time by said booting setup program; and
- converting said high frequencies into said time units continuously, and adding said time units one by one to obtain said use time, and storing and recording said use time.

13. The method of claim 12, wherein said processor further includes a comparator and a mean time between failures (MTBF), and said comparator processes a procedure comprising the steps of:
- reading said use time;
- comparing said use time based on said mean time between failures (MTBF) to determine whether or not said use time falls within the range of said mean time between failures (MTBF); and
- issuing a warning signal, when said use time is determined to be falling within the range of said mean time between failures (MTBF).

14. A method for alerting the life expectancy of a processor, which is applied in a processor having a predetermined use time, and said processor processes a procedure comprising the steps of:
- issuing a plurality of high frequencies continuously;
- converting said high frequencies separately into a time unit;
- deducing said time units from said predetermined use time one by one, and storing and recording a result; and
- issuing a warning, when the remaining predetermined use time is detected and determined as not a positive integer.

* * * * *